PREMAKARAN T. BOAZ
INVENTOR.

BY John R. Faulkner
Glenn S. Arendsen

ATTORNEYS

UNITED STATES PATENT OFFICE

3,468,650
Patented Sept. 23, 1969

3,468,650
PROCESS USING GAS INLETS TO LATERALLY STRETCH AND STABILIZE GLASS DURING FLOAT GLASS MANUFACTURING
Premakaran T. Boaz, Lincoln Park, Mich., assignor to Ford Motor Company, Dearborn, Mich., a corporation of Delaware
Filed May 10, 1967, Ser. No. 637,398
Int. Cl. C03b 18/00
U.S. Cl. 65—91                                4 Claims

ABSTRACT OF THE DISCLOSURE

Gas inlets comprising longitudinally slotted tubes are located longitudinally along and slightly outboard of the edges of a glass ribbon floating on molten tin in the float chamber used in manufacturing glass by the float process. Powerful pumps draw the gas atmosphere existing in the float chamber laterally outward across the surface of the glass and laterally inward from the side walls of the chamber. The glass drawn across the surface laterally stretches the glass to a thickness less than its equilibrium thickness while the gas drawn inward stabilizes the lateral position of the glass.

SUMMARY OF THE INVENTION

In the manufacture of glass by the float process, molten glass is floated on a molten metal bath where the glass ribbon attains an equilibrium thickness usually of about 0.280 inch. Processes for producing glass of a more useful thickness by the float process including longitudinally stretching the glass by power driven rolls located at the end of the float chamber, laterally stretching the glass by outwardly biased rollers positioned near the entrance to the float chamber as disclosed in U.S. patent application Ser. No. 482,510, now abandoned, or laterally stretching the glass near the entrance to the float chamber by fluid issuing from outwardly directed fluid outlets as disclosed in U.S. patent application Ser. No. 572,497. The disclosures of both of these patent applications are incorporated herein by this reference. Because of the instability of the ribbon resulting from the multitudinous forces acting thereon during these lateral stretching processes, the ribbon tends to move back and forth laterally on the surface of the molten metal. This movement distorts the glass and causes other product and manufacturing difficulties.

This invention provides a process for laterally stretching glass to a thickness differing from equilibrium thickness during its manufacture by the float process that inherently stabilizes the lateral position of the glass ribbon in the float chamber. The process comprises floating a continuous ribbon of glass on a molten metal bath in a float chamber, positioning gas inlets adjacent the edges of the ribbon, and drawing gas laterally outward across the surface of the ribbon to the gas inlets to laterally stretch the ribbon and decrease the thickness thereof while pulling the ribbon through the float chamber and cooling the ribbon into structurally integral glass.

Elongated tubes having longitudinal slots located slightly outboard of the ribbon preferably are used to draw the gaseous protective atmosphere of the float chamber at least laterally outward across the surface and laterally inward from the side walls of the chamber toward the edges of the ribbon. The gas drawn outwardly across the surface laterally stretches the ribbon to less than its equilibrium thickness and the gas drawn inward toward the edges of the ribbon stabilizes its lateral position within the float chamber.

The phrase "laterally stretching" is used in this application to identify both a physical widening of the ribbon with a decrease in its thickness and a diminished narrowing of the ribbon under a longitudinal stretching force that decreases its thickness. In the latter situation, the physical width of the ribbon can actually remain constant. Thus, the phrase refers to active or passive lateral stretching. The phrase "structurally integral" refers to glass that has been cooled sufficiently to be handled by normal mechanical rollers or conveyors without distorting, marring, or encountering other defects.

DETAILED DESCRIPTION

Figure 1:
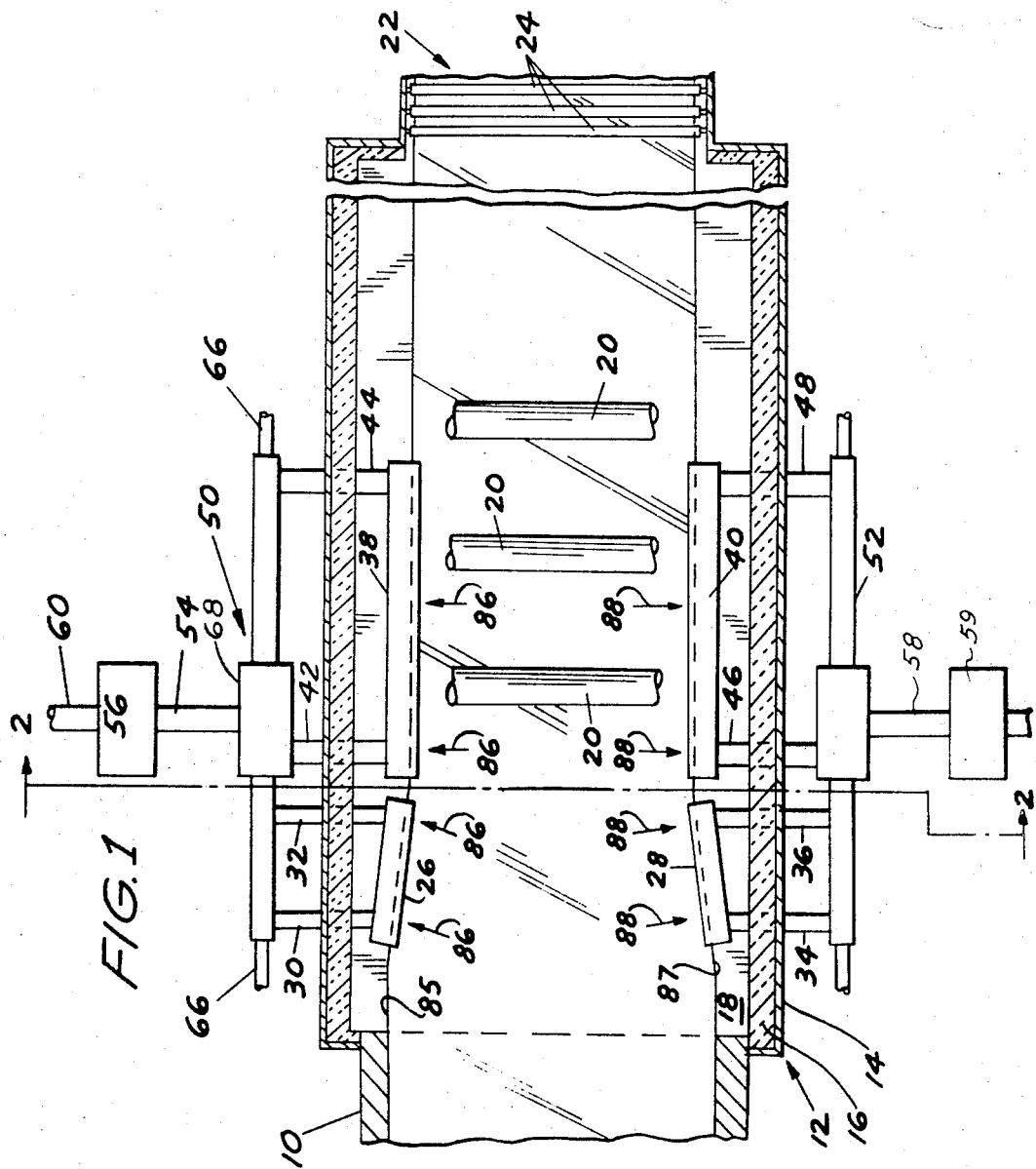
FIGURE 1 is a sectional view taken through the top of a float chamber showing two separate tubes that serve as gas inlets positioned along each edge of the ribbon.

Referring to FIGURE 1, a spout 10 connects a glass melting and refining furnace (not shown) with the interior of a float chamber represented by numeral 12. Float chamber 12 is similar to the float chamber described in Basler et al. U.S. patent application Ser. No. 404,247, filed Oct. 16, 1964, now U.S. Pat. No. 3,332,763, the disclosure of which is incorporated herein by this reference, and comprises an enclosing housing 14 that is lined by refractory material 16.

Molten metal 18 such as tin covers the bottom of the interior of chamber 12 and a plurality of cooling coils 20 pass laterally through chamber 12 above molten metal 18. An exit 22 from chamber 12 has a plurality of power driven rolls 24 positioned therein.

Downstream, or to the right in FIGURE 1, of spout 10, tubes 26 and 28 are located on each side of the interior of chamber 12 and are angled slightly inward to diverge from the adjacent side wall of chamber 12. The ends of tubes 26 and 28 are closed by welding a plate (not shown) thereon. Exhaust pipes 30 and 32 are fastened to tube 26 near the ends thereof and pass through the side wall of chamber 12. Pipes 30 and 32 support tube 26 a short distance above the surface of molten metal 18. Similarly, exhaust pipes 34 and 36 are fastened to tube 28 and pass through the adjacent side wall of chamber 12.

Downstream of tubes 26 and 28, similar tubes 38 and 40 are positioned along the respective side wall of chamber 12. Exhaust pipes 42 and 44 are fastened near the ends of tube 38 and pass through the adjacent side wall of chamber 12 while exhaust pipes 46 and 48 are fastened near the ends of tube 40 and pass through the opposite side wall.

Exhaust pipes 30, 32, 42 and 44 are connected to a manifold 50 and exhaust pipes 34, 36, 46 and 48 are connected to a manifold 52 located outside chamber 12 and on opposite sides thereof. Manifold 50 is connected to the inlet 54 of a gas pump 56 and, similarly, manifold 52 is connected to the inlet pipe 58 of a gas pump 59.

Figure 2:
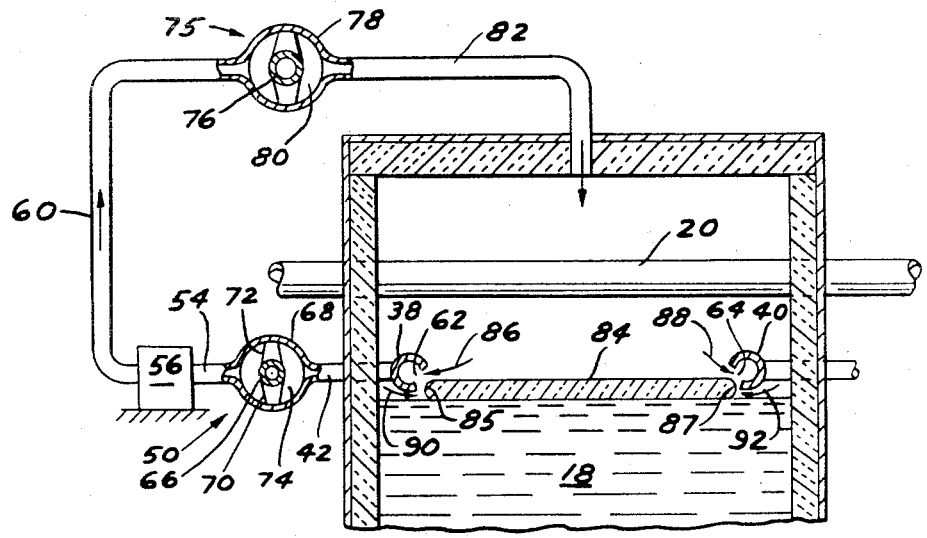
FIGURE 2 is a sectional view taken along line 2—2 of FIGURE 1 showing additional details of the tubes, gas inlets, and a gas circulating and heat exchanging system.

Referring to FIGURE 2, tubes 38 and 40 have respective longitudinal slots 62 and 64 cut into the lower inward sides and communicating with the passages in the tubes. Manifold 50 comprises a pipe 66 supported in a larger concentric pipe 68 by spaced webs 70 and 72. An annular space 74 exists between pipe 66 and pipe 68 and exhaust pipes 30, 32, 42 and 44 and inlet pipe 54 communicates with space 74.

Pump 56 has its outlet pipe 60 connected to a second manifold 75. Manifold 75 is similar in structure to manifold 50 and comprises a pipe 76 supported in a larger concentric pipe 78 with an annular space 80 therebetween. Pipe 60 communicates with space 80 and a plurality of return pipes, one of which is represented by 82, connect space 80 with the top of the interior of chamber 12. Pipes 66 and 76 communicate through a fluid pump (not shown) with each other. Some of the return pipes communicate with the chamber interior downstream of tubes 38 and 40.

Manifold 52 and a manifold similar in construction and location to manifold 75 are positioned on the opposite side of float chamber 12 where exhaust pipes 34, 36, 46 and 48 communicate with the annular space in manifold 52.

Tubes 38 and 40 are sufficiently upstream of exit 22 to prevent the tubes from drawing gas out of the annealing lehr (not shown). Additionally, the gas inlets in the tubes preferably are sufficiently inward from the side walls of the float chamber so the slight vacuum existing around the inlets does not intersect the refractory material 16, which tends to be relatively porous.

The interior of float chamber 12 above the molten metal can be pressurized slightly with a protective gaseous atmosphere that does not oxidize the molten tin. A typical atmosphere consists essentially of nitrogen with small amounts (i.e., up to about 4%) of a reducing gas such as hydrogen. Small amounts of carbon monoxide can be added if desired but no more than traces of oxygen, carbon dioxide, or water vapor should be present.

Operation

Spout 10 delivers molten glass from the furnace onto the surface of molten metal 18 in the form of a ribbon 84, the edges of which are represented by solid and dotted lines 85 and 87 in FIGURE 1. Ribbon 84 is cooled as it moves to the right in float chamber 12 and is a structurally integral sheet of glass when it reaches power driven rolls 24. Rolls 24 exert sufficient force on the glass to pull the ribbon through the float chamber.

Gas pump 56 and the corresponding pump connected to the annular space in manifold 52 draw the gaseous atmosphere existing in chamber 12 into slots 62 and 64 and similar slots in tubes 26 and 28. Tubes 26, 28, 38 and 40 are positioned just outboard of ribbon 84 and just above the surface of molten metal 18 so gas drawn into the slots flows laterally outward across the surface of ribbon 84 as represented by arrows 86 and 88 (FIGURE 2) and laterally inward toward the edges of the ribbon as represented by arrows 90 and 92.

The gas moving across the surface of the ribbon laterally stretches the ribbon. Gas represented by arrows 90 and 92 stabilizes the lateral position of the ribbon in the float chamber because movement of the ribbon toward tube 38, for example, increases the pressure of gas 90 and the force exerted thereby on the adjacent edge of the ribbon. Simultaneously, the increase in velocity of gas 92 entering slot 64 produces a vacuum on that adjacent edge. Thus the ribbon edges have a metering relationship with the slots. The pressure exerted by gas 90 and the vacuum exerted by gas 92 combine to urge the ribbon back to its proper lateral position.

Since the gas existing in the interior of chamber 12 is at a relatively high temperature, it is preferably to cool the gas before it enters pump 56 and its corresponding pump. This is accomplished for pump 56 by manifolds 50 and 75. A heat exchanging medium is circulated in pipes 66 and 76 by the pump connecting these pipes. In manifold 50 this medium absorbs heat from the gas passing through space 74 and this heat is transferred back to the gas in manifold 75 before the gas re-enters the chamber. A heat pumping arrangement can be used between manifolds 50 and 75 if necessary.

Figure 3:
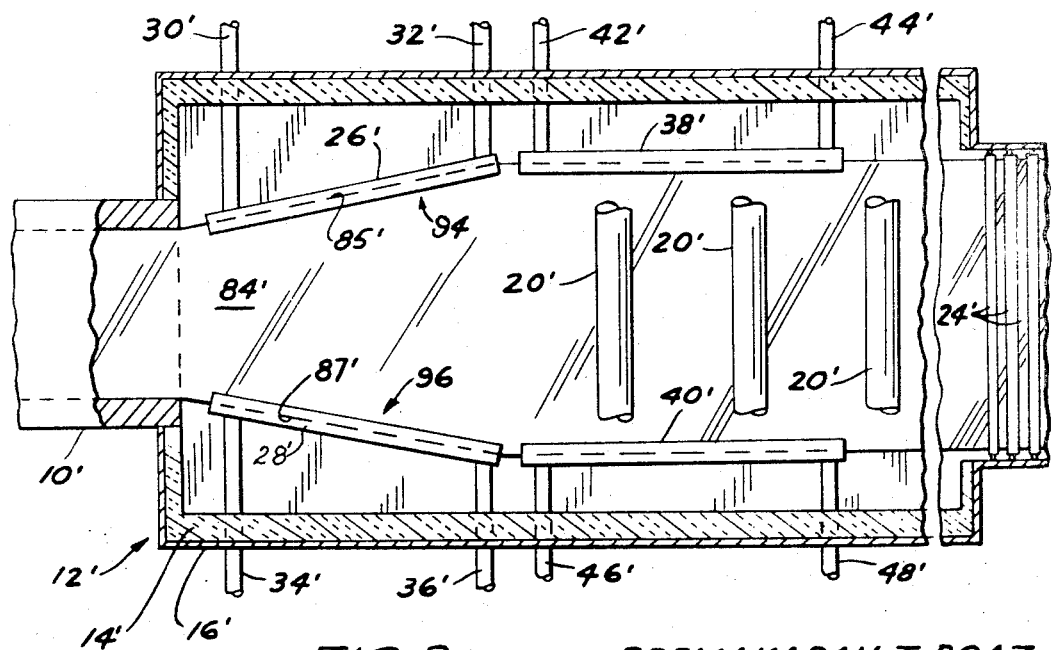
FIGURE 3 is a top sectional view of an alternate embodiment in which the gas inlets are angled outward to stretch the ribbon laterally in an active manner.

Construction and operation of FIG. 3

FIGURE 3 shows the use of gas inlets to laterally stretch a glass ribbon actively rather than passively as shown in FIGURE 1. In FIGURE 3, tubes 26' and 28' are located closer to spout 10' and are angled outward to converge with the adjacent side wall of chamber 12'. Tubes 38' and 40' are positioned downstream of tubes 26' and 28', respectively, and are substantially parallel to the side walls of chamber 12'. Each of the tubes is constructed according to the above description and is supported by appropriate exhaust pipes. Gas pumps (not shown) are connected to the exhaust pipes and draw gas into the slots of the tubes as described above.

As the molten glass ribbon emerges from spout 10' onto the surface of molten metal 18, gas represented by arrows 94 and 96 is drawn laterally and longitudinally upstream across the surface of ribbon 84'. The lateral components of gas 94 and 96 actively stretches the ribbon laterally, and the longitudinal upstream components act on the surface of the ribbon to restrain the longitudinal drawing forces provided by rolls 24'. These drawing forces tend to pull the molten ribbon away from the spout, thereby breaking ribbon continuity. Knurled rollers can be positioned along the edges of the ribbon in FIGURE 1 to restrain the drawing forces if desired.

Gas drawn inward to the slots in tubes 26', 28', 38' and 40' laterally stabilize the ribbon in the chamber, and gas drawn laterally outward across the surface of the ribbon to the slots in tubes 38' and 40' perform passive lateral stretching, as described with reference to FIGURES 1 and 2.

In place of tubes containing longitudinal slots, individually positionable nozzles can serve as the fluid inlets. Each nozzle or tube can be connected to a separate fluid pump to increase the flexibility of the arrangement. The tubes or nozzles preferably are coated with carbon, boron nitride or other materials that prevent sticking to the glass ribbon in case of contact therewith and inhibit corrosion by the molten tin. While the tubes preferably are parallel with the adjacent ribbon edge ordinarily, divergence or convergence with the edge can be used. The ribbon can be permitted to come to equilibrium thickness before lateral stretching or lateral stretching forces can be exerted thereon as soon as the molten glass emerges onto the molten metal. Filters or other materials capable of removing oxygen, carbon dioxide, water vapor or other harmful materials from the gas can be located in the gas recirculating system.

Thus this invention provides a process for laterally stabilizing and stretching a ribbon of glass in the float chamber during the manufacture of glass by the float process. Stabilizing and stretching can be done simultaneously or individially. Active or passive lateral stretching can be achieved, and forces preventing the longitudinal force drawing the ribbon through the float chamber can be provided without physically touching the glass. Improved quality is attained by pulling the ribbon through the float chamber with sufficient longtitudinal force to narrow the ribbon laterally, and drawing sufficient gas laterally outward across the ribbon surface to diminish the narrowing, thereby laterally stretching the ribbon in a passive manner.

What is claimed is:

1. A process for laterally stabilizing a ribbon of glass in the float chamber during the manufacture of glass by the float process that comprises floating a continuous ribbon of glas on a molten bath in a float chamber, positioning a longitudinally slotted tube gas inlet near each edge of the ribbon, said slot facing the upper longitudinal edge of the ribbon, drawing gas laterally inward across the surface of the bath toward each ribbon edge by producing a vacuum at the gas inlets, so that the gas drawn laterally inward between an edge of the ribbon and the member forming the gas inlet at said edge so movement of the ribbon edge toward the gas inlet increases the gas pressure acting on that edge to urge the ribbon away from the gas inlet, said movement simultaneously decreasing the gas pressure acting on the opposite longitudinal edge to urge the ribbon toward the gas inlet at said opposite longitudinal edge, and pulling the ribbon through the float chamber while cooling the ribbon.

2. The process of claim 1 comprising drawing gas laterally outward across the ribbon surface to the gas inlets to laterally stretch the ribbon.

3. The process of claim 2 comprising pulling the ribbon through the float chamber with sufficient longitudinal force to laterally narrow the ribbon, and drawing sufficient gas laterally outward across the surface of the ribbon to diminish the narrowing.

4. The process of claim 3 comprising pressurizing the interior of the float chamber with the gas and positioning the gas inlets so any vacuum existing around the inlets does not contact the interior of the float chamber.

References Cited

UNITED STATES PATENTS

| | | | |
|---|---|---|---|
| 3,241,939 | 3/1966 | Michalik | 65—99 |
| 3,345,149 | 10/1967 | Michalik et al. | 65—182 |

FOREIGN PATENTS

| | | |
|---|---|---|
| 732,043 | 2/1943 | Germany. |
| 635,217 | 11/1963 | Republic of Soutth Africa. |

S. LEON BASHORE, Primary Examiner

E. R. FREEDMAN, Assistant Examiner

U.S. Cl. X.R.

65—65, 99, 182, 200, 201